United States Patent
Koshy (10) Patent No.: US 10,750,541 B1
(45) Date of Patent: Aug. 18, 2020

(54) ADAPTIVE ANTENNA STEERING BASED ON WIRELESS MAC STATE

(71) Applicant: Dell Products, LP, Round Rock, TX (US)

(72) Inventor: Kamal J. Koshy, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/538,626

(22) Filed: Aug. 12, 2019

(51) Int. Cl.
*H04W 74/08* (2009.01)
*H01Q 3/00* (2006.01)

(52) U.S. Cl.
CPC .......... *H04W 74/0816* (2013.01); *H01Q 3/00* (2013.01)

(58) Field of Classification Search
CPC .. H01Q 3/00; H01Q 3/24; H01Q 3/26; H01Q 3/2605; H04W 72/04; H04W 72/0413; H04W 72/046; H04W 72/08; H04W 74/0808; H04W 74/0816; H04W 74/00; H04B 7/00; H04B 7/04; H04B 7/0404; H04B 7/0408; H04B 7/0413
See application file for complete search history.

(56) References Cited

U.S. PATENT DOCUMENTS

| | | | | |
|---|---|---|---|---|
| 7,366,463 | B1 * | 4/2008 | Archer | H04B 7/18563 342/352 |
| 8,675,617 | B2 * | 3/2014 | Cha | H01Q 3/2611 343/754 |
| 2016/0381590 | A1 * | 12/2016 | Lysejko | H04W 24/10 370/252 |
| 2018/0359780 | A1 * | 12/2018 | Zhang | H04W 74/085 |
| 2018/0376505 | A1 * | 12/2018 | Zhang | H04L 12/189 |
| 2019/0200385 | A1 * | 6/2019 | Xue | H04B 7/0486 |
| 2019/0230706 | A1 * | 7/2019 | Li | H04W 72/0453 |

* cited by examiner

Primary Examiner — Blane J Jackson
(74) Attorney, Agent, or Firm — Prol Intellectual Property Law, PLLC; H. Kenneth Prol (57) ABSTRACT

An information handling system may include a network interface device; an antenna communicatively coupled to the network interface device to communicatively couple the information handling system to a wireless network device; and an antenna optimization system to selectively switch the antenna between an omni-directional antenna electromagnetic radiation pattern during listening periods for channel occupancy during collision avoidance protocol to a directed electromagnetic radiation pattern emission during data transmissions directed to the wireless network device.

20 Claims, 5 Drawing Sheets

FIG. 5

ADAPTIVE ANTENNA STEERING BASED ON WIRELESS MAC STATE

CROSS REFERENCE TO RELATED APPLICATIONS #

Related subject matter is contained in the following co-pending applications:

U.S. application Ser. No. 16/368,726, filed Mar. 28, 2019, entitled "METHOD AND APPARATUS FOR INTELLIGENT SCHEDULING OF NETWORK EVALUATION IN WIRELESS LAN NETWORKS," invented by Udaya Bendigeri et al., and assigned to the assignee hereof.

FIELD OF THE DISCLOSURE

The present disclosure generally relates to wireless communications from an information handling system. The present disclosure more specifically relates to collision avoidance of data transmissions over a wireless network using an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for a system and method for avoiding collisions of data transmission within a wireless network. The systems and methods described herein allow for the adaptive ability of an antenna of a wireless information handling system to switch between an omni-directional antenna electromagnetic radiation pattern emission to a directed electromagnetic radiation pattern emission based on the transmissions of data across the wireless network. In an example, an information handling system may switch from an omni-directional antenna electromagnetic radiation pattern emission to a directed electromagnetic radiation pattern emission when the information handling system is to send data and the recipient of the data transmission (i.e., an access point) is available to receive the data transmission. The directed electromagnetic radiation pattern emission may include the changing of a main lobe of the radiation pattern emitted by the antenna using phase modulation or other types of beam steering processes or hardware. When the data transmission is complete, the antenna information handling system may revert back to emitting an omni-directional antenna electromagnetic radiation pattern emission so as to listen for traffic sent across the wireless network for collision avoidance arbitration.

The adaptive ability to switch between an omni-directional antenna electromagnetic radiation pattern emission and a directed electromagnetic radiation pattern emission allows for better average performance of the antenna of the information handling system by providing for the adaptability of the antenna electromagnetic radiation pattern emissions of the antenna based on data to be or being transmitted across the wireless network. In specific examples, the electromagnetic radiation emitted by the antenna may be reduced thereby reducing the specific absorption rate (SAR) to a human body within the proximity of the information handling system or any other device communicatively coupled to the wireless network. Additionally, the electromagnetic radiation emitted by the antenna may be reduced thereby reducing the amount of power consumed by the wireless devices of the information handling system. Because the electromagnetic radiation pattern may be a directed electromagnetic radiation pattern emission, a relatively stronger, directed signal may be produced by the antenna increasing the ability to transmit the data.

In the present disclosure and in the appended claims, the term "wireless device" is meant to be understood as any device that is communicatively coupled to a wireless network. Examples of wireless devices include, but is not limited to, access points, routers, modems, desktop computing devices, laptop computing devices, tablet devices, personal digital assistants (PDAs), and smartphones, among others.

Figure 1:
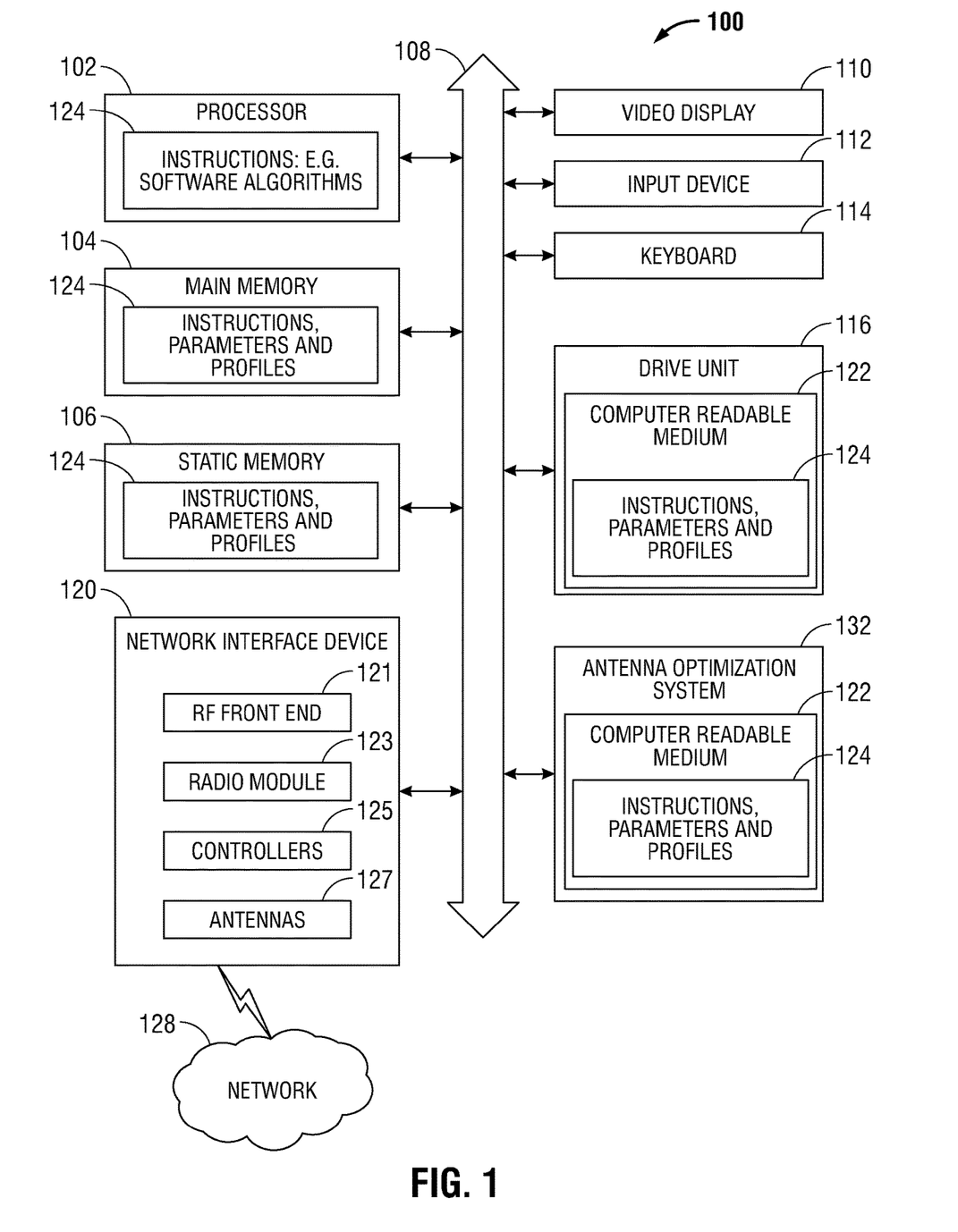
FIG. 1 is a block diagram illustrating an information handling system according to an embodiment of the present disclosure.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the antenna optimization system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input, and a keyboard 114. The information handling system 100 can also include a disk drive unit 116 that may receive and read a computer readable medium.

The network interface device shown as wireless adapter 120 may provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection such as to network 128. Network interface device 120 may be a wireless adapter and may include electronics and structures to support wireless communications. For example, network interface device 120 may include a radio frequency (RF) front end circuit 121 for control and driving data signals on communication bands as well as modulation and demodulation, amplification, and other functions. Network interface device 120 may also include controllers 125 or other processors to execute some or all of the antenna optimization system 132 of the collision avoidance of embodiments described herein. Network interface device 120 may also include one or more steerable antennas 127 for reception and transmission of signals via wireless communications. Additionally, network interface device 120 may include a radio module 127 to support one or more wireless communication standard protocols. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links. In embodiments presented herein, the network interface device 120 may include a steerable antenna 127 that emits an electromagnetic wave defining data to be received by other devices coupled to the network 128 such as an access point or other information handling systems.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer-based functions disclosed herein. For example, instructions 124 may execute an antenna optimization system 132, software agents, or other aspects or components. Various software modules comprising application instructions 124 may be coordinated by an operating system (OS) and/or via an application programming interface (API). An example operating system may include Windows®, Android®, and other OS types. Example APIs may include Win 32, Core Java API, or Android APIs.

The disk drive unit 116 and the electropermanent magnet keyboard control system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 116 and static memory 106 may also contain space for data storage. Further, the instructions 124 may embody one or more of the methods or logic as described herein. For example, instructions relating to the antenna optimization system 132 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the antenna optimization system 132 may be executed locally or remotely. In an example, the antenna optimization system 132 may be basic input/output system (BIOS) driven such that the firmware associated with the BIOS of the information handling system executes the algorithms, processes, and/or methods of the antenna optimization system 132 described herein. In an example, logic associated with the wireless adapter may execute the algorithms, process, and/or method of the antenna optimization system 132 described herein. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The antenna optimization system 132 may be stored in static memory 106, or the drive unit 116 on a computer-readable medium 122 such as a flash memory or magnetic disk in another example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the antenna optimization system 132 that may be operably connected to the bus 108. The antenna optimization system 132 computer readable medium 122 may also contain space for data storage. The antenna optimization system 132 may, according to the present description, perform tasks related to avoiding data congestion and/or collisions in a wireless network and may operate a code instruction executed at processing logic in the network interface device 120 such as controller 125, via CPU 102, or a combination thereof. In some embodiments, the collisions of data packets may be prevented while adjusting the steerable antenna of the network interface device so as to selectively switch the steerable antenna between an omni-directional antenna electromagnetic radiation pattern emission to a directed electromagnetic radiation pattern emission based on data transmissions within a wireless network.

In an embodiment, the antenna optimization system 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

During operation, the information handling system 100 may, in an embodiment, execute the antenna optimization system 132 as computer-readable program code that directs an antenna of the network interface device 120 to switch from an omni-directional electromagnetic radiation pattern emission to a directed electromagnetic radiation pattern emission based on the various data transmissions within a wireless network the information handling system 100 is communicatively coupled thereto.

Previous wireless devices may transmit and receive data over the wireless network where each of the network interface devices 120, during a receive operation, checks the received signal strength indicator (RSSI) of the received data packets for any type of electromagnetic radiation pattern emitted by the antenna. In these previous wireless devices, the electromagnetic pattern is varied and the pattern that results in the highest RSSI is chosen in receiving the data packets. Additionally, during this data receiving process in these previous wireless devices, other electromagnetic patterns are sampled as a way to check if the antenna pattern is to be changed to increase the RSSI. When multiple information handling systems 100 attempt to access a wireless network via an access point, a lack of consideration of transmissions on the wireless channels may result in data collisions within the wireless traffic. To utilize some form of central coordination that determines which of the wireless devices should transmit and/or receive data at any given time, these systems may implement some collision avoidance protocol that prevents such collisions. A specific example of this protocol may be carrier-sense multiple access (CSMA)/collision avoidance (CA) in which a node (i.e., the network interface device 120 or access point) verifies that absence of other traffic within the wireless network before transmitting in such a way as to avoid collisions by beginning transmission only after the channel is sensed to be "idle." In the above examples, where antenna pattern steering is engaged, some or all of the nodes cannot receive data packets from other nodes except that node to which the pattern is steered. Thus, this antenna pattern steering in previous wireless systems may enable a wireless device to transmit to an access point relatively more efficiently, but with the side-effect of creating antenna nulls or voids directed towards other devices that may be transmitting but cannot be detected by the antenna thereby degrading the listening capability to implement the collision avoidance. When this occurs, an access point may receive the transmitted signal from both wireless devices resulting in a collision due to the access point being incapable of decoding both signals.

The presently described information handling system 100, however, executes the antenna optimization system 132 so as to adaptively enable an omni-directional antenna pattern when the information handling system 100 is "listening" for channel occupancy. In the present specification and in the appended claims, the term "channel occupancy" is meant to be understood as available bandwidth at a wireless network device to transmit or receive data to or from an information handling system. Thus, during any collision avoidance protocol described herein, the antenna optimization system 132 of the information handling system 100 may use any collision avoidance protocol to discover if channel occupancy exists. This may be done prior to the information handling system 100 transmitting a data packet to, for example, a commonly accessed wireless network device such as an access point. Additionally, the information handling system 100 may execute the antenna optimization system 132 so as to adaptively enable antenna pattern steering for omni-directional listening even where no data packets are to be transmitted to the access point. Still further, the information handling system 100 may execute the antenna optimization system 132 so as to adaptively enable antenna pattern steering otherwise toward or optimized for transmitting any data packets to the access point when a channel is clear for transmission (i.e., when channel occupancy is determined). Even still further, the information handling system 100 may execute the antenna optimization system 132 so as to adaptively enable antenna pattern steering when receiving data packets from the access point when the channel is clear or, in other words, channel occupancy exists. Thus, the present embodiments enables the selective ability of the information handling system 100 to initiate an omni-directional antenna electromagnetic radiation pattern emission and/or directed electromagnetic radiation pattern emission based whether the information handling system 100 is to "listen" to traffic within the wireless network or send/receive data packets from an access point. This implements the improved elements of antenna pattern steering without compromising wireless data transmission performance within the wireless network.

Figure 2:
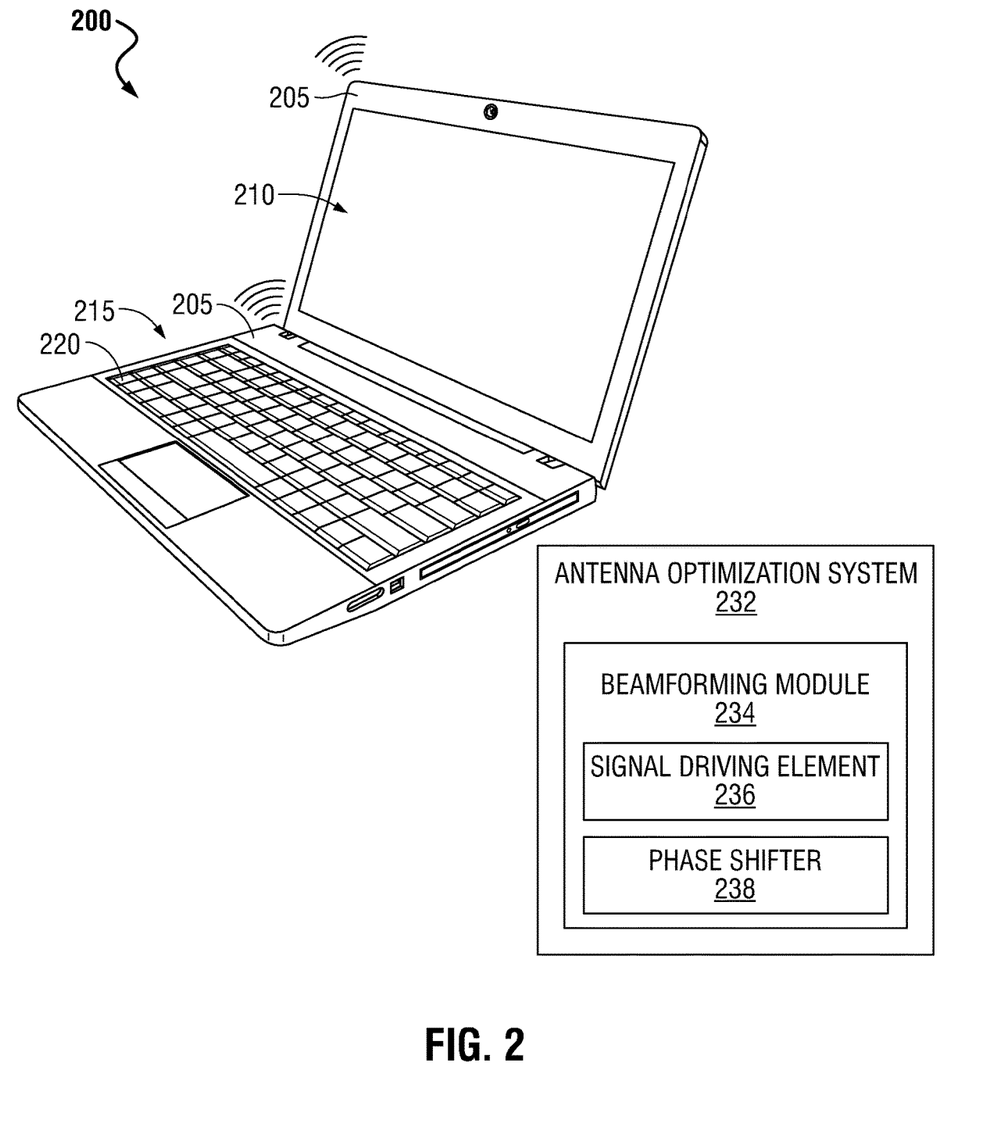
FIG. 2 is a perspective graphical diagram of an information handling system according to an embodiment of the present disclosure.

FIG. 2 is a block diagram illustrating an information handling system 200 according to an embodiment of the present disclosure. The information handling system 200 may be any type of device that computes, classifies, processes, transmits, receives, retrieves, originates, switches, stores, displays, manifests, detects, records, reproduces, handles, or uses any form of information, intelligence, or data for business, scientific, control, entertainment, or other purposes. In the example shown in FIG. 2, the information handling system 200 is a laptop device that includes a screen portion 210 including a screen to present visual data to a user. The information handling system 200 may also include a keyboard portion 215 that includes a number of actuatable keys 220 that allows a user to provide input to the information handling system 200. Via interaction with the keyboard portion 215 by a user, the user may input data into the information handling system 200 and receive output from the screen portion 210. Information handling system 200 may include one or more antenna system locations 205. Any number of antenna systems 205 may be present and the shown locations are meant to examples locations without limiting the present specification. Although FIG. 2 shows the information handling system 200 as a laptop computing device, the present description contemplates that any type of computing device and/or combination of computing devices may be used to execute the processes and methods described herein.

The information handling system 200 may include an antenna optimization system 232 that controls how a steerable antenna of the information handling system 200 operates. The antenna optimization system 232 may be code instruction executed on a controller or other processing logic in the network interface device in some embodiments. In other embodiments, the antenna optimization system 232 may operate on the CPU, at the network interface device, remotely, or some combination thereof. In specific embodiments presented herein, the antenna optimization system 232 may specifically control what type of electromagnetic radiation pattern is emitted from the steerable antenna. As described herein, the antenna optimization system 232 may control the antenna to emit, based on certain wireless network characteristics, an omni-directional antenna electromagnetic radiation pattern emission and a directed electromagnetic radiation pattern emission based on data transmissions within a wireless network. The omni-directional antenna electromagnetic radiation pattern emission may radiate equal or near equal power in all directions perpendicular to an axis of the antenna so as to provide wireless transmission detections throughout the wireless network.

In an embodiment, the antenna may be part of a steerable antenna system that allows for the selective switching between an omni-directional antenna electromagnetic radiation pattern emission and a directed electromagnetic radiation pattern emission as well as allows for the ability to steer the directed electromagnetic radiation pattern at a direction of any other device communicatively coupled to the wireless network. In a specific embodiment, the directed electromagnetic radiation pattern emission may be accomplished by changing a direction of a main lobe of a radiation pattern emitted by the antenna. The main lobe of the radiation pattern emitted by the antenna may be accomplished by adjustments made to the antenna's hardware and or computer-readable program code driving the signals emitted by the antenna. To accomplish this, the antenna optimization system 232 may interface with any signal driving elements 236 and/or phase shifters associated with the beamforming module 234 within the radio frequency front end circuitry of the network interface device. The beamforming module 234 may be any hardware, computer-executable instructions, or a combination therefore that directs that hardware of the antenna to selectively emit either of an omni-directional antenna electromagnetic radiation pattern emission or a directed electromagnetic radiation pattern emission at the antenna based on the characteristics of the wireless network. As such, when the antenna is directed by the antenna optimization system 232 to form a directed electromagnetic radiation pattern emission, the vector of the directed electromagnetic radiation pattern emission may be based on a location of a wireless device communicatively coupled to the wireless network. This may be accomplished by interfacing with these wireless devices and detecting a received signal strength indicator (RSSI) value and direct the directed electromagnetic radiation pattern emission to a location where the RSSI value is the highest. Beamforming module 234 may select among a plurality of antenna transmitters or antenna parasitic elements to which to direct current, depends upon frequency band, to steer the radiofrequency direction or beam.

During operation of the information handling system 200, the antenna optimization system 232 may initiate an omni-directional antenna electromagnetic radiation pattern emission at an antenna of an information handling system prior to transmission of data to a wireless network device. In an embodiment, this omni-directional antenna electromagnetic radiation pattern emission may be initiated so as to adaptively listen to data transmissions over the wireless network and, in an example, determine traffic at an access point. This omni-directional antenna electromagnetic radiation pattern emission may also allow for the information handling system 200 to better listen to other wireless devices as to detect any transmissions presented to the access point or to the information handling system 200 itself on a channel.

Additionally, during operation of the information handling system 200, the antenna optimization system 232 may determine a lack of transmission of data to the wireless network device. In this case the antenna optimization system 232 may receive any input from the wireless network device (i.e., an access point) describing the availability of the wireless network device to receive data from the information handling system 200. In an embodiment, this data may be in the form of a clear-to-send (CTS) that is either in the positive or negative.

Still further, during operation of the information handling system 200, the antenna optimization system 232 may initiate a directed electromagnetic radiation pattern emission at the antenna of the information handling system 200 based on the lack of detected transmissions of data across the wireless network. As described herein, certain hardware and/or computer-executable program code may direct a main lobe of an electromagnetic radiation pattern towards or at the access point so as to better transmit and/or receive data packets from the access point. This direction may have been determined from previous transmissions of wireless data signals. In a specific embodiment, the signal driving element 236 and phase shifter 238 may be employed to radiate a common frequency of the electromagnetic radiation emitted so as to steer a single beam of the electromagnetic radiation in a specific direction. Different frequencies may be used to steer the electromagnetic radiation in different directions to serve different users. The direction the electromagnetic radiation is sent in may be calculated dynamically by the antenna optimization system 232 determining from previous transmissions. In particular, beam orientation yielding best RSSI values, improved bit error rates, or other quality of service factors for signal quality may be used in some embodiments. In other embodiments, a directed beam in a direction that may depend on antenna location may be selected in other embodiments. For example, an antenna 205 in a base portion 215 may be directed in an upward direction to access an area away from the base portion 215 and display 210 toward a presumed access point in an embodiment.

Figure 3:
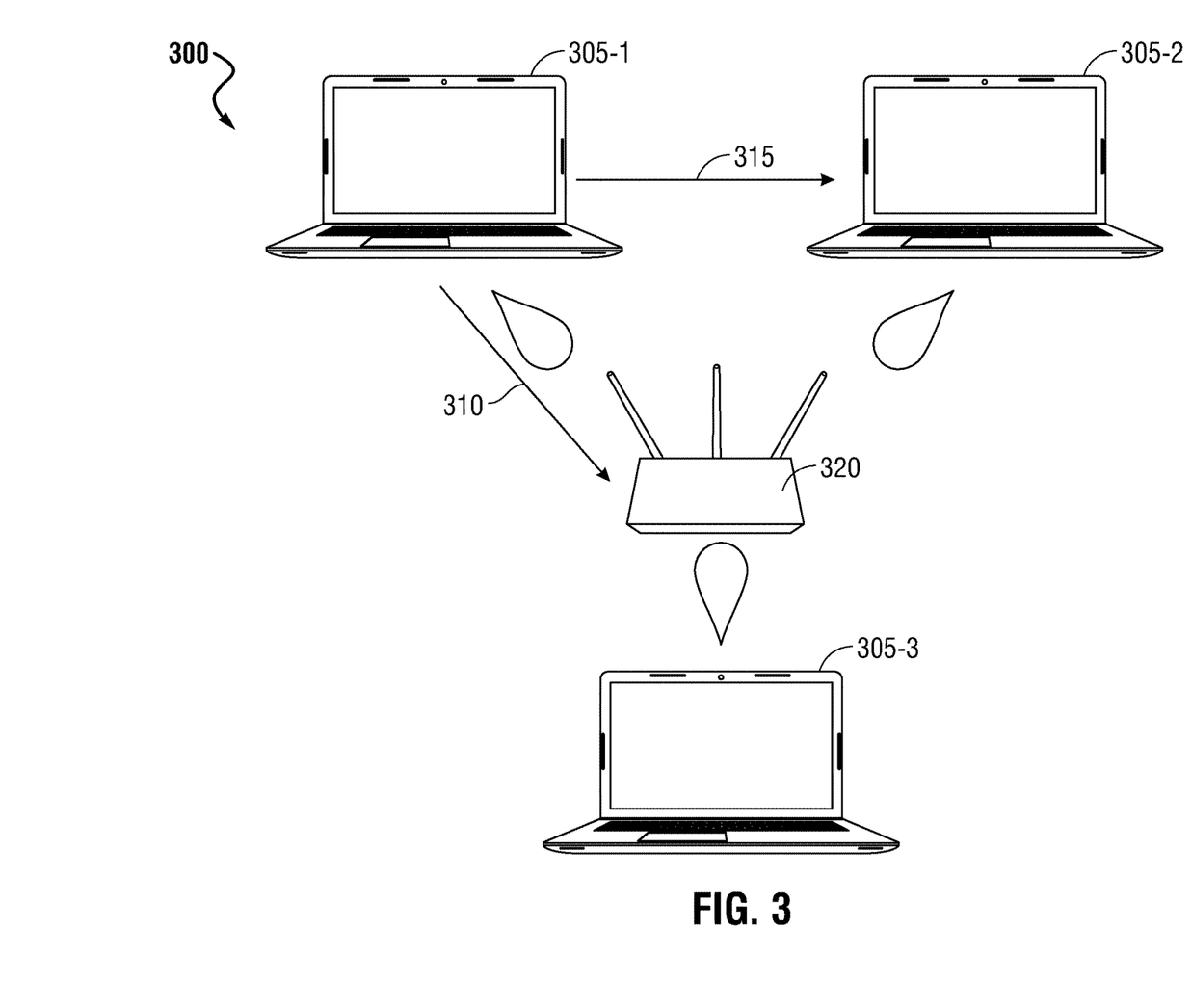
FIG. 3 is a graphical diagram of a wireless network including a plurality of information handling systems according to an embodiment of the present disclosure.

FIG. 3 is a graphical diagram of a wireless network 300 including a plurality of information handling systems 305-1, 305-2, and 305-3 according to an embodiment of the present disclosure. The wireless network 300 may also include an access point 320 to which each of the information handling systems 305-1, 305-2, and 305-3 may gain access to the wireless network 300. In an embodiment, the access point 320 may include a wired connection to a server or other computing device that extends the wireless network 300 and/or allow for access by each of the information handling systems 305-1, 305-2, and 305-3 to an intranet, the Internet, or any other network that includes other information handling systems.

Each of the information handling systems 305-1, 305-2, and 305-3 may act as described herein relative to each other as well as relative to the access point 320. In particular, a first information handling system 305-1, by way of example, may interact with each of the other information handling systems 305-2 and 305-3 and the access point 320 by selectively initiating an omni-directional antenna electromagnetic radiation pattern emission and a directed electromagnetic radiation pattern emission based on traffic presented across the wireless network. Specifically, as the first information handling system 305-1 is prompted to transmit data across the network to, for example, the access point 320, the first information handling system 305-1 may initiate, using the antenna optimization system, an omni-directional antenna electromagnetic radiation pattern emission. This is done so that the first information handling system 305-1 may "listen" to traffic at the access point as well as at any other information handling system 305-2 and 305-3 for use of the wireless signal channels. During initiation of the omni-directional antenna electromagnetic radiation pattern emission, the first information handling system 305-1 may detect the location of the access point using stored RSSI data and/or triangulation of the location of the access point 320. In an embodiment, the first information handling system 305-1 may engage in a process to verify the absence of traffic across the wireless network such as with the carrier-sense multiple access/collision avoidance (CSMA/CA) process before transmitting any data. During this time, the antenna optimization system may initiate the omni-directional antenna electromagnetic radiation pattern emission so as to continually listen to the traffic presented across the wireless network from the other information handling systems 305-2 and 305-3. When the first information handling system 305-1 has determined that there is an absence of traffic across the wireless network (i.e., via a positive clear-to-send indication from the access point), the antenna optimization system may initiate a directed electromagnetic radiation pattern emission to the access point so as to increase the signal strength.

As this occurs, the data transmissions from the other information handling systems 305-2 and 305-3 may not be detected. However, the present specification contemplates that the other information handling systems 305-2 and 305-3 are also implementing the systems and processes described herein so that they also actively switch between the omni-directional antenna electromagnetic radiation pattern emission and directed electromagnetic radiation pattern emission in order to detect traffic across the wireless network by the first information handling system 305-1. As such, the other information handling systems 305-2 and 305-3 may defer transmissions until those information handling systems also detect an absence of traffic over the wireless network. In an embodiment, the other information handling systems 305-2 and 305-3 engage in a distributed coordinated function interframe space (DIFS) and/or arbitration inter-frame spacing (AIFS) process. The DIFS process includes sensing, by the other information handling systems 305-2 and 305-3, the status of the wireless medium prior to any data transmission by the other information handling systems 305-2 and 305-3 such that if the other information handling systems 305-2 and 305-3 detect that the wireless network is continuously idle for a certain duration, it is then permitted to transmit data across the wireless network. The AIFS process includes prioritizing some access category (AC) data over other such as giving voice or video priority over email and/or increasing or decreasing duration of time (i.e., interframe space) any of the information handling systems 305-1, 305-2, and 305-3 waits before transmitting data across the wireless network.

During operation, the first information handling system 305-1 may also switch from the directed electromagnetic radiation pattern emission to the omni-directional antenna electromagnetic radiation pattern emission after the data has been transmitted to the access point. This may be done so as to listen to data transmissions that may have been in initiated by the other information handling systems 305-2 and 305-3 during the time the first information handling system 305-1 has ended the data transmission and/or after the access point has sent out an acknowledgement of data receipt to the first information handling system 305-1.

Figure 4:
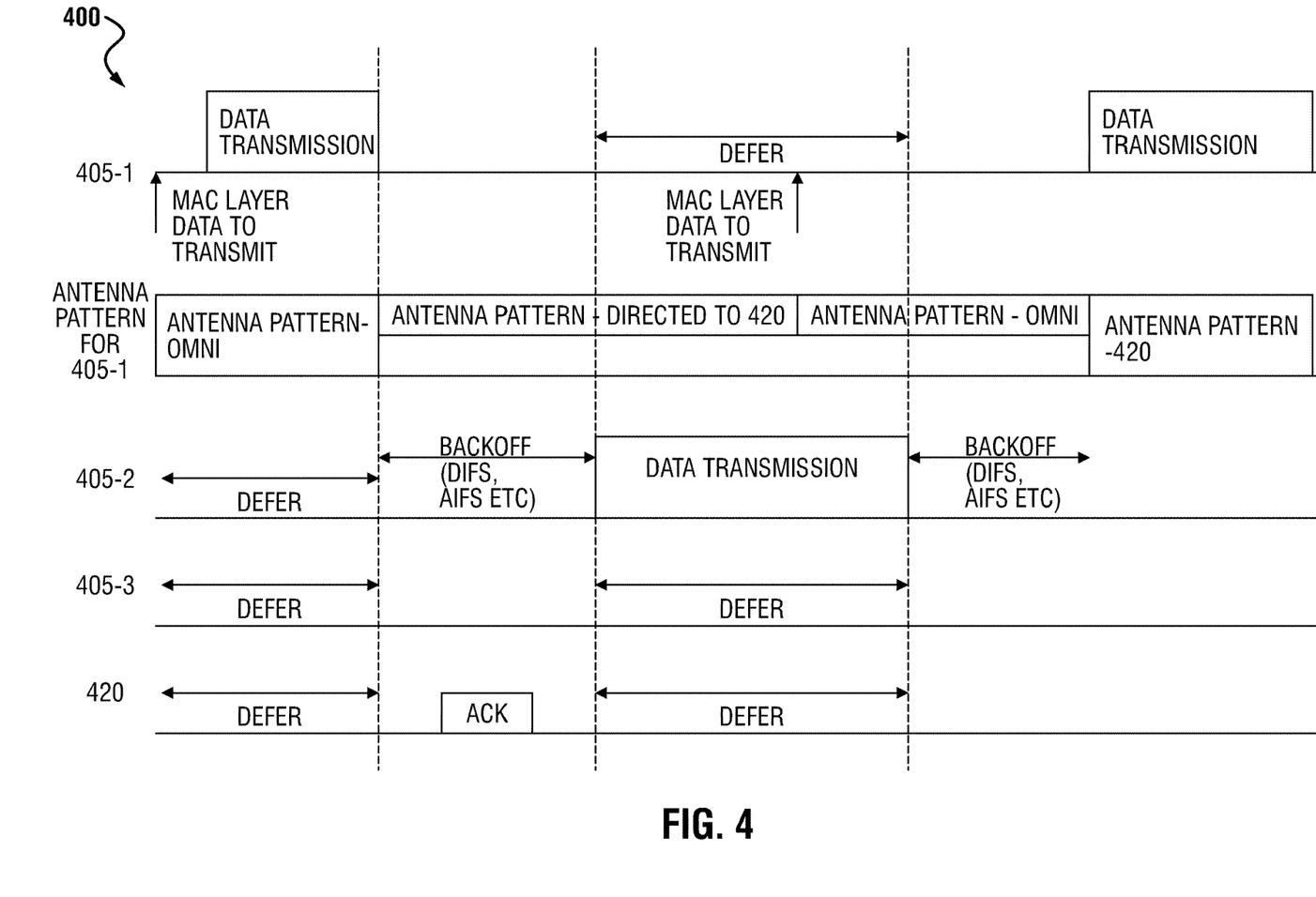
FIG. 4 a sequence diagram depicting a method of avoiding collisions in a wireless network according to an embodiment of the present disclosure.

FIG. 4 is a sequence diagram 400 depicting a method of avoiding collisions in a wireless network according to an embodiment of the present disclosure. For example, information handling systems 405-1, 405-2, 405-3 may utilize a CSMA/CA protocol. The sequence diagram 400 shows the data transmissions between and the interaction among a first information handling system 405-1, a second information handling system 405-2, a third information handling system 405-3, and an access point 420. The sequence diagram 400 also depicts the state of the antenna pattern of the first information handling system 405-1: i.e., whether the antenna is set to an omni-directional antenna electromagnetic radiation pattern emission or a directed electromagnetic radiation pattern emission.

As described herein, the first information handling system 405-1 (or any other information handling system 405-2 and 405-3) may be directed to transmit data over the wireless network to the access point 420. In an example, this data may include data from a data link layer such as the medium access control (MAC) sublayer of the first information handling system 405-1. The sequence diagram 400 begins with the antenna of the first information handling system 405-1 being set to an omni-directional antenna electromagnetic radiation pattern emission. The other information handling systems 405-2 and 405-3 may be set to initiate an omni-directional antenna electromagnetic radiation pattern emission as well depending on whether data is to be transmitted or listening is to occur during a defer period from these other information handling systems 405-2 and 405-3. Selection of which information handling system 405-1, 405-2, 405-3 is to transmit is determined under the CSMA/CA protocol via assignment of random countdown values and a remainder countdown system for each of the information handling systems 405-1, 405-2, 405-3 attempting to access the access point 420.

The sequence diagram 400 shows that the first information handling system 405-1 is to send data to the access point 420. As described herein the first information handling system 405-1 may listen for an absence of data traffic across the wireless network using this omni-directional antenna electromagnetic radiation pattern emission and determine that the access point is idle and ready to receive a data transmission (i.e., via receipt of a positive CTS signal). At this time, the first information handling system 405-1 adaptively switch the antenna from emitting the omni-directional antenna electromagnetic radiation pattern emission to emitting the directed electromagnetic radiation pattern emission. The directed electromagnetic radiation pattern emission may be directed in the direction of the access point 420 so as to increase the signal strength from the first information handling system 405-1. This adaptation of the antenna pattern increases the overall performance of the first information handling system 405-1 in transmitting data even if reducing a transmission power to the antenna or reducing a real-time specific absorption rate (SAR) or energy absorbed by a human body as a result of the emission of the electromagnetic radiation from the antenna is required. Indeed, where some of the information handling systems are in the form of tablet devices where the transmission power is reduced in light of SAR considerations, the adaptive emission of the directed electromagnetic radiation pattern emission rather than the omni-directional antenna electromagnetic radiation pattern emission during transmissions allows for greater average wireless performance. The increase in wireless performance of these information handling systems results in relatively more efficient data transmissions and overall user satisfaction.

As the data transmission is finished by the first information handling system 405-1, the antenna optimization system of the first information handling system 405-1 may reinitiate the omni-directional antenna electromagnetic radiation pattern emission as any other information handling systems 405-2 and 405-3 also transmit data in later frames.

The period of time between an initiation of data transmission to the access point 420 by the first information handling system 405-1 and the completion of this data transmission may cause the other information handling systems 405-2 and 405-3 to defer any data transmissions upon them detecting the channel occupied and their countdown not expired. Again, after the deference period, the other information handling systems 405-2 and 405-3 may enter a back-off state that includes the execution of a DIFS and/or AIFS process as described herein. During this back-off state, the access point 320 may send an acknowledgment to the first information handling system 405-1 that the data was received by the access point 420.

The methods and processes shown and described in connection with the sequence diagram 400 may be equally applied to all devices coupled to the wireless network. In this embodiment, each of the other information handling systems 405-2 and 405-3 apart from the first information handling system 405-1 may also engage in the processes described herein. Specifically, all of the other information handling systems 405-2 and 405-3 as well as the first information handling system 405-1 may adaptively switch to and from the omni-directional antenna electromagnetic radiation pattern emission and directed electromagnetic radiation pattern emission per the criteria descried herein.

Figure 5:
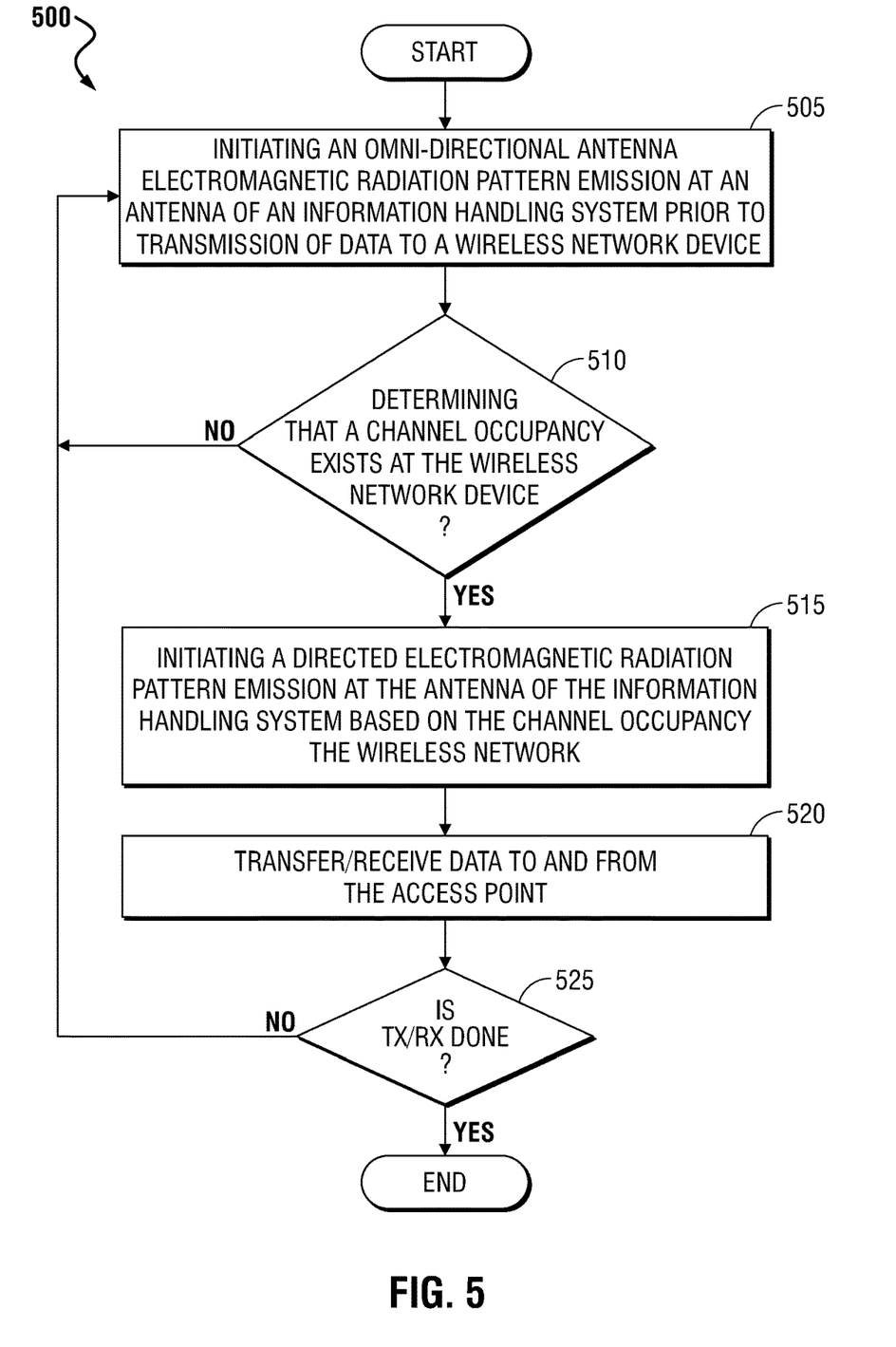
FIG. 5 is a flow diagram illustrating a method of avoiding collisions with enhanced signal capability during transmission or reception in a wireless network according to an embodiment of the present disclosure.

FIG. 5 is a flow diagram illustrating a method 500 of avoiding collisions in a wireless network according to an embodiment of the present disclosure. The method 500 may include initiating at block 505 an omni-directional antenna electromagnetic radiation pattern emission at an antenna of an information handling system prior to transmission of data to a wireless network device. As described herein, the omni-directional antenna electromagnetic radiation pattern emission allows for one of a plurality of wireless network information handling systems to listen to traffic across the wireless network. In an embodiment, the information handling systems may monitor a specific bandwidth or plurality of bandwidths to determine whether traffic is present or absent on those bandwidths. Thus, these information handling systems communicatively coupled to the wireless network may include both a transceiver and a receiver to transmit and receive, respectively, data over the wireless network.

The method 500 may continue with a determination at decision diamond 510 whether there is a lack of transmission of data to the wireless network device. This determination may include a first information handling system communicating to an access point to determine whether any other information handling system is communicating with the access point. If there is another information handling system communicating with the access point, flow may return to 505 where the first information handling system may enter a deferred state such that the first information handling system backs-off by executing a DIFS and/or AIFS process as described herein. The omni-directional electromagnetic radiation pattern is maintained until the next frame. In this specific embodiment, a negative CTS signal may be sent to the first information handling system describing that the access point is busy or otherwise cannot receive the data transmission from the first information handling system. In other embodiments, the busy channel (i.e., no channel occupancy decision at block 510) and no expiration of the countdown may indicate a deferred period occurs for the first information handling system and the omni-directional antenna electromagnetic radiation pattern is maintained at block 505.

If there is not channel occupancy at the access point and the countdown timer has expired or a clear to send (CTS) signal is received, the method may proceed to block 515 to initiate, a directed electromagnetic radiation pattern emission at the antenna of the information handling system based on the lack of detected transmissions of data across the wireless network. The detection of the lack of transmissions of data may be accomplished by receiving a signal from the receiving device such as the access point described herein indicating that it can receive data. This signal may be in the form of a CTS signal propagated using an IEEE 802.11 RTS/CTS mechanism. Again, in another embodiment, selection of which information handling system among any number of information handling systems is to transmit may be determined under the CSMA/CA protocol via assignment of random countdown value to each information handling system along with a remainder countdown system carried forward to a next frame (i.e., DIFS) for each of the information handling systems 405-1, 405-2, 405-3 attempting to access the access point. Other mechanism exists and the present specification contemplates any method or process that allows the first information handling system to detect when a receiving device is ready to receive the data to be transmitted.

The initiation at block 515 of the directed electromagnetic radiation pattern emission may be cause the antenna of the first information handling system to adjust directionality towards the access point. As described herein, in an embodiment, the direction of the directed electromagnetic radiation pattern emission may be determined based on a triangulation of the access point. In another embodiment, the direction of the directed electromagnetic radiation pattern emission may be based off of detected RSSI data descriptive of the direction that the strongest received signal strength is located. At 520, the system may transfer and receive data to and from the access point.

The method 500 may also include an acknowledgement signal being received by the first information handling system. This acknowledgement signal may indicate to the first information handling system has received the data transmission and/or the entirety of the data that was to be transmitted. In some embodiments, the data transmissions may include header data that describes the length of data being sent and, therefore, the amount of data the access point can expect to receive. If the amount of data is not received, a signal may be received by the first information handling system indicating a transmission failure allowing the first information handling system to resend the data transmission by reinitiating the method 500 described herein.

Proceeding to determination block 525, if the transfer/receipt is completed for the first information handling system (i.e., determination yes), the method 500 may end. If not, the flow may return to 505 to reset and listen for a clear channel and determine its turn to receive/transmit in another frame (i.e., determination no).

The blocks of the flow diagrams of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
a processor, a memory, and a network interface device;
an antenna communicatively coupled to the network interface device to communicatively couple the information handling system to a wireless network access point of a wireless network;
an antenna optimization system to initiate an omni-directional antenna electromagnetic radiation pattern emission and a randomized countdown procedure when the information handling system detects another device communicating with the wireless network access point; and
the antenna optimization system to selectively switch the antenna between an omni-directional antenna electromagnetic radiation pattern during listening periods for channel occupancy during collision avoidance protocol to a directed electromagnetic radiation pattern emission during data transmissions directed to the wireless network access point.

2. The information handling system of claim 1, wherein emission of the omni-directional antenna electromagnetic radiation pattern is initiated prior to the information handling system transmitting data to the wireless network access point to prevent collision of data packets among a plurality of distinct wireless network access points and the information handling system.

3. The information handling system of claim 1, wherein emission of the omni-directional antenna electromagnetic radiation pattern is initiated prior to the information handling system receiving data from the wireless network access point.

4. The information handling system of claim 1, wherein the direction of the emission of the directed electromagnetic radiation pattern is initiated based on a positive clear-to-send notification received from the wireless network access point.

5. The information handling system of claim 1, wherein the direction of the emission of the directed electromagnetic radiation pattern is directed towards the wireless network access point from which the information handling system has received a clear-to-send response from the wireless network access point.

6. The information handling system of claim 1, wherein emission of the omni-directional antenna electromagnetic radiation pattern is reinitiated from the directed electromagnetic radiation pattern emission when a packet receipt acknowledgment is received from the wireless network access point.

7. The information handling system of claim 1, wherein the information handling system comprises a steerable antenna system that includes one of:
   an antenna parasitic element to direct a main lobe of an electromagnetic radiation pattern towards the wireless network access point; or
   a plurality of signal driving elements and a phase shifter to radiate a common frequency of the electromagnetic radiation emitted by the plurality of signal driving elements so as to steer a single beam of the electromagnetic radiation in a specific direction.

8. A method of avoiding collisions in a wireless network, comprising:
   initiating an omni-directional antenna electromagnetic radiation pattern emission at an antenna of an information handling system prior to transmission of data to a wireless network access point of a wireless network during a listening period and a randomized countdown procedure when the information handling system detects another device communicating with the wireless network access point;
   determining that a channel occupancy exists at the wireless network access point; and
   initiating a directed electromagnetic radiation pattern emission at the antenna of the information handling system based on the channel occupancy at the wireless network.

9. The method of claim 8, wherein a direction of the emission of the directed electromagnetic radiation pattern is initiated based on a positive clear-to-send notification received from the wireless network access point.

10. The method of claim 8, wherein the direction of the emission of the directed electromagnetic radiation pattern is directed towards the wireless network access point from which the information handling system has received a clear-to-send response from the wireless network access point.

11. The method of claim 8, comprising reinitiating the emission of the omni-directional antenna electromagnetic radiation pattern from the directed electromagnetic radiation pattern emission when a packet receipt acknowledgment is received from the wireless network access point.

12. The method of claim 8, comprising, at the information handling system, reinitiating emission of the omni-directional antenna electromagnetic radiation pattern back from the directed electromagnetic radiation pattern emission when a packet receipt acknowledgment is received from the wireless network access point.

13. The method of claim 8, comprising, at the information handling system, initiating an omni-directional antenna electromagnetic radiation pattern emission upon an acknowledgement received from the wireless network access point that data from the information handling system was received by the wireless network access point.

14. The method of claim 8, wherein the direction of the emission of the directed electromagnetic radiation pattern is directed towards the wireless network access point when the information handling system is determining the existence of any data transmissions at the wireless network access point.

15. A wireless information handling system, comprising:
   a processor;
   a wireless card comprising a signal-adaptive antenna; and
   an antenna optimization system to, when executed by the processor:
      initiate an omni-directional antenna electromagnetic radiation pattern emission at the signal-adaptive antenna when listening to data transmissions within a wireless network to determine channel occupancy at an access point;
      initiate a randomized countdown procedure when the wireless information handling system detects another device communicating with the access point; and
      initiate a directed electromagnetic radiation pattern emission at the access point and transmit data to the access point when a clear-to-send signal is received from the access point.

16. The wireless information handling system of claim 15, wherein emission of the omni-directional antenna electromagnetic radiation pattern is initiated prior to the information handling system transmitting data to the access point to prevent collision of data packets between a plurality of devices communicatively coupled to the wireless network and to the information handling system.

17. The wireless information handling system of claim 15, wherein the direction of the emission of the directed electromagnetic radiation pattern is determined based on detected RSSI values at a plurality of directed electromagnetic radiation patterns.

18. The wireless information handling system of claim 15, wherein the direction of the emission of the directed electromagnetic radiation pattern is directed towards the access point from which the wireless information handling system has received a clear-to-send response from the access point.

19. The wireless information handling system of claim 15, wherein emission of the omni-directional antenna electromagnetic radiation pattern is reinitiated from the directed electromagnetic radiation pattern emission when a packet receipt acknowledgment is received from the access point.

20. The wireless information handling system of claim 15, wherein the information wireless handling system determines a location of the access point by comparison of stored RSSI values at distinct directed electromagnetic radiation patterns.

* * * * *